(12) United States Patent
Hikita

(10) Patent No.: US 10,556,541 B2
(45) Date of Patent: Feb. 11, 2020

(54) VEHICLE PERIPHERY MONITORING DEVICE AND VEHICLE PERIPHERY MONITORING SYSTEM

(71) Applicant: TOYOTA JIDOSHA KABUSHIKI KAISHA, Toyota-shi, Aichi (JP)

(72) Inventor: Toshiro Hikita, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 16/037,608

(22) Filed: Jul. 17, 2018

(65) Prior Publication Data
US 2018/0319338 A1    Nov. 8, 2018

Related U.S. Application Data

(63) Continuation of application No. 14/415,898, filed as application No. PCT/JP2013/069675 on Jul. 19, 2013, now Pat. No. 10,046,701.

(30) Foreign Application Priority Data

Jul. 20, 2012    (JP) .................................. 2012-161918

(51) Int. Cl.
*B60R 1/00*    (2006.01)
*G08G 1/16*    (2006.01)
(Continued)

(52) U.S. Cl.
CPC ............ *B60R 1/00* (2013.01); *G01C 21/3697* (2013.01); *G08G 1/09626* (2013.01);
(Continued)

(58) Field of Classification Search
CPC . B60R 1/00; B60R 2300/302; B60R 2300/50; B60R 2300/802; B60R 2300/70;
(Continued)

(56) References Cited

U.S. PATENT DOCUMENTS

| 4,988,476 A * | 1/1991 | Sadaoka | ................ G21C 17/06 |
| | | | 376/245 |
| 6,202,009 B1 * | 3/2001 | Tseng | ...................... B60T 8/171 |
| | | | 180/197 |

(Continued)

FOREIGN PATENT DOCUMENTS

| JP | H08-293098 A | 11/1996 |
| JP | 2005-318519 A | 11/2005 |

(Continued)

OTHER PUBLICATIONS

"Side Monitoring System," (URL: http://toyota.jp/dop/navi/lineup/option/side_monitoring_system/), Toyota Motor Corporation, (retrieved Jul. 20, 2013).

(Continued)

*Primary Examiner* — Joseph Suh
(74) *Attorney, Agent, or Firm* — Oliff PLC

(57) ABSTRACT

A vehicle periphery monitoring device includes a location information acquisition unit configured to acquire a current location of the vehicle; a vehicle-mounted camera configured to capture an image of the exterior of the vehicle; a display device configured to display the image; a caution point information storage unit configured to store information relating to a caution point, which is a location where use of the vehicle-mounted camera is recommended; and a control unit configured to carry out vehicle exterior image display to output the image acquired by the vehicle-mounted camera to the display device, wherein the control unit carries out the vehicle exterior image display when it is determined that the caution point is present near the acquired current location.

6 Claims, 15 Drawing Sheets

(51) Int. Cl.
   *H04N 7/18* (2006.01)
   *G01C 21/36* (2006.01)
   *G08G 1/0962* (2006.01)
   *G08G 1/0967* (2006.01)

(52) U.S. Cl.
   CPC . *G08G 1/096716* (2013.01); *G08G 1/096775* (2013.01); *G08G 1/16* (2013.01); *H04N 7/181* (2013.01); *H04N 7/188* (2013.01); *B60R 2300/302* (2013.01); *B60R 2300/50* (2013.01); *B60R 2300/70* (2013.01); *B60R 2300/802* (2013.01)

(58) Field of Classification Search
   CPC .. H04N 7/188; H04N 7/181; G08G 1/096775; G08G 1/096716; G08G 1/09626; G08G 1/16; G01C 21/3697
   See application file for complete search history.

(56) References Cited

U.S. PATENT DOCUMENTS

| | | | | |
|---|---|---|---|---|
| 7,274,741 | B2 * | 9/2007 | Ma | G06K 9/00711 375/240.08 |
| 2001/0016797 | A1 * | 8/2001 | Ogura | G06T 7/246 701/301 |
| 2004/0158366 | A1 * | 8/2004 | Dieterle | B60K 31/0008 701/23 |
| 2005/0049782 | A1 * | 3/2005 | Nakano | G01C 21/3647 701/455 |
| 2005/0164685 | A1 * | 7/2005 | Yoshioka | H04W 24/00 455/414.1 |
| 2005/0222753 | A1 * | 10/2005 | Ishikawa | B60R 1/00 701/409 |
| 2006/0050312 | A1 * | 3/2006 | Takiyama | H04N 1/00132 358/1.15 |
| 2006/0215020 | A1 * | 9/2006 | Mori | B60R 1/00 348/119 |
| 2008/0059054 | A1 * | 3/2008 | Yamada | G01C 21/00 701/301 |
| 2009/0271105 | A1 * | 10/2009 | Kindo | G01C 21/3407 701/439 |
| 2010/0250369 | A1 * | 9/2010 | Peterson | G06Q 30/0261 705/14.58 |
| 2010/0289818 | A1 * | 11/2010 | Hirooka | G06F 17/211 345/619 |
| 2011/0018991 | A1 | 1/2011 | Watanabe et al. | |
| 2011/0026901 | A1 * | 2/2011 | Kashima | G11B 27/034 386/282 |
| 2011/0258155 | A1 * | 10/2011 | Akiyama | H04N 21/25891 706/50 |
| 2012/0133202 | A1 * | 5/2012 | Mui | B60L 3/10 303/152 |
| 2012/0304960 | A1 * | 12/2012 | Weaver | B60W 10/06 123/325 |
| 2012/0320212 | A1 | 12/2012 | Aimura et al. | |
| 2013/0073094 | A1 * | 3/2013 | Knapton | G05B 13/02 700/278 |
| 2013/0211682 | A1 * | 8/2013 | Joshi | G08G 1/0967 701/70 |
| 2013/0342333 | A1 * | 12/2013 | Hutchings | H04N 7/18 340/435 |

FOREIGN PATENT DOCUMENTS

| | | |
|---|---|---|
| JP | 2007-172491 A | 7/2007 |
| JP | 2008-015561 A | 1/2008 |
| JP | 2009-119895 A | 6/2009 |
| JP | 2009-246808 A | 10/2009 |
| JP | 2009-278349 A | 11/2009 |
| JP | 2012-173269 A | 9/2012 |

OTHER PUBLICATIONS

May 17, 2017 Office Action Issued In U.S Appl. No. 14/415,898.
Nov. 14, 2017 Office Action issued in U.S. Appl. No. 14/415,898.
Apr. 13, 2018 Notice of Allowance issued in U.S. Appl. No. 14/415,898.

* cited by examiner

CAMERA RECOMMENDATION LEVEL DATA

| No | LOCATION INFORMATION | CAMERA RECOMMENDATION LEVEL |
|---|---|---|
| 1 | LAT.A NORTH LONG.B EAST | 10 |
| 2 | LAT.C NORTH LONG.D EAST | 20 |
| ... | ... | ... |

FIG. 11

CAMERA RECOMMENDATION LEVEL DATA

| No | LOCATION INFORMATION | ROAD TYPE | NUMBER OF CAMERA OPERATIONS(CRAWL) | NUMBER OF CAMERA OPERATIONS(SLOW) | NUMBER OF CAMERA OPERATIONS(OTHER) | CAMERA RECOMMENDATION LEVEL |
|---|---|---|---|---|---|---|
| 1 | LAT.A NORTH LONG.B EAST | INTERSECTION | 50 | 20 | 10 | 100 |
| 2 | LAT.C NORTH LONG.D EAST | NARROW STREET | 10 | 20 | 10 | 20 |
| ... | | | | | | |

FIG. 15

VEHICLE PERIPHERY MONITORING DEVICE AND VEHICLE PERIPHERY MONITORING SYSTEM

CROSS-REFERENCE TO RELATED APPLICATION(S)

This application is a continuation of U.S. application Ser. No. 14/415,898 filed Jan. 20, 2015, which is based on International Patent Application No. PCT/JP2013/069675 filed on Jul. 19, 2013 which is based on and claims priority under 35 U.S.C. 119 from Japanese Patent Application No. 2012-161918 filed on Jul. 20, 2012. The contents of the above applications are incorporated herein by reference.

TECHNICAL FIELD

The present invention relates to technology for monitoring the periphery of a vehicle by a camera.

BACKGROUND ART

A vehicle exterior monitoring system is known in which a camera is installed outside a vehicle and the dead angles from the driver's seat are monitored from inside the vehicle cabin. For example, with the monitoring system disclosed in Non-Patent Document 1, it is possible to display a monitoring image of the exterior of the vehicle, by the driver pressing a switch, and the driver is able to drive while looking at the image to check safety.

The switching between display and non-display of the monitoring image can be performed automatically on the basis of the speed of the vehicle, as well as being performed by operating a switch. For example, the image can be displayed when travelling at low speed, and the display can be turned off automatically when the vehicle gathers more speed.

Furthermore, there is technology which automatically determines whether or not the vehicle is in a situation which requires a safety check of the periphery of the vehicle, and which displays a monitoring image in an active fashion. For example, in the invention disclosed in Patent Document 1, the width of the roadway on which the vehicle is travelling is determined by image analysis, and when the vehicle appears to be entering a broad road from a narrow road, it is determined that a safety check is necessary, and the monitoring image is displayed automatically. Consequently, the driver is able to check the safety at the periphery of the vehicle, without operating a switch.

CITATION LIST

Non Patent Literature

Non-Patent Document 1:
"Side monitoring system", [online], Toyota Motor Corporation.

PATENT LITERATURE

Patent Document 1: Japanese Patent Application Publication No. 2009-246808

SUMMARY OF INVENTION

The majority of vehicle exterior monitoring devices which are currently available commercially have a function for performing an automatic display on the basis of information which can be acquired from a sensor provided in the vehicle, such as vehicle speed information. However, if a determination is based on sensor information alone, then there is an inconvenience in that a monitoring image is displayed in situations where it is not necessary. For example, in a device which provides a monitoring display when the vehicle speed is low, then monitoring is started up even when the vehicle is stopped at traffic signals. Therefore, there are many cases where the driver has to switch off the main switch while travelling, in cases where monitoring is not necessary, and hence the automatic display function is not utilized sufficiently.

Furthermore, although it is possible to determine that a monitoring display is necessary by analyzing an acquired image, as in Patent Document 1, due to issues with the accuracy of image recognition, a problem arises in that a monitoring display may not be provided when necessary, and there is also a problem in that the actual device used to recognize the images involves a cost.

The present invention was devised in view of the problems mentioned above, an object thereof being to provide a vehicle periphery monitoring device and a vehicle periphery monitoring system, whereby it is possible to determine that the vehicle is travelling in a location where caution is required in driving, and whereby an image of the exterior of the vehicle can be displayed automatically.

In order to achieve the abovementioned object, the vehicle periphery monitoring device and the vehicle periphery monitoring system relating to the present invention carry out display of vehicle exterior images by the following means.

The vehicle periphery monitoring device according to a first aspect of the present invention is a monitoring device which is mounted in a vehicle.

More specifically, the vehicle periphery monitoring device comprises a location information acquisition unit configured to acquire a current location of the vehicle; a vehicle-mounted camera configured to capture an image of the exterior of the vehicle; a display device configured to display the image; a caution point information storage unit configured to store information relating to a caution point, which is a location where use of the vehicle-mounted camera is recommended; and a control unit configured to carry out vehicle exterior image display to output the image acquired by the vehicle-mounted camera to the display device, wherein the control unit carries out the vehicle exterior image display when it is determined that the caution point is present near the acquired current location.

The vehicle determines if the vehicle is travelling in a location where use of a vehicle-mounted camera which captures images of the exterior of the vehicle is recommended, from the information relating to stored caution points and the acquired current location information, and carries out display of a vehicle exterior monitor image (called "vehicle exterior image" below). The information relating to caution points is information which can identify the locations of caution points. The stored information may be the co-ordinates of the caution points, for example, or may be a corresponding area code, or the like, if map information is provided. Furthermore, the information may be the actual map information itself. If the map information includes information relating to the interconnections and shapes of roads, then locations which require caution when driving can be extracted as caution points. By adopting a configuration of this kind, it is possible to suppress unnecessary display of vehicle exterior images, and it is also possible to display vehicle exterior images reliably, at required locations.

Furthermore, the caution point information storage unit may store map information and the control unit may determine a caution point on the basis of information included in the map information. For instance, information relating to locations where caution is required when driving, for instance, locations which are near an intersection, curves where visibility is poor, places where a vehicle joins a road having priority from a minor road, and the like, may be acquired from the map information and may be treated as caution points.

Furthermore, the control unit may treat a narrow street defined in the map information, as a caution point, and the control unit may treat an intersection defined in the map information, as a caution point. A narrow street means a narrow road having a width equal to or less than a prescribed value. By adopting a configuration of this kind, it is possible to suppress the display of vehicle exterior images in circumstances where there is little danger of contact.

Furthermore, the vehicle periphery monitoring device relating to the present invention may further comprise a vehicle speed acquisition unit which acquires the speed of the vehicle; and the control unit may carry out a vehicle exterior image display, when the speed of the vehicle is lower than a prescribed value.

If the speed of the vehicle is high, then it is possible to infer that the vehicle is not in a location where it is necessary to travel with caution. Therefore, by providing a threshold value for the speed and carrying out a vehicle exterior image display only when the speed is lower than the threshold value, it is possible to suppress unnecessary display.

Furthermore, the vehicle periphery monitoring device relating to the present invention may further comprise a camera point storage unit configured to store camera point information, which is information indicating locations where a driver has carried out vehicle exterior image display manually. The control unit may carry out the vehicle exterior image display by further referring to a result of comparing the acquired current location information and the camera point information.

When the current location of the vehicle is near a location where vehicle exterior image display has been carried out manually by a driver in the past, a vehicle exterior image display can be carried out preferentially. By adopting a configuration of this kind, it is possible to carry out automatic display, even in locations where it cannot be determined whether a vehicle exterior image display ought to be carried out on the basis of the previously stored information, for instance, a parking place at an individual home. The control unit may carry out vehicle exterior image display unconditionally in a location which corresponds to camera point information, or may determine whether or not to carry out vehicle exterior image display on the basis of a number of times the vehicle has passed through the point in the past, or a number of times that an image has been display, or the like.

Furthermore, the camera point storage unit may store the camera point information and a type of vehicle-mounted camera or a display method used by a driver in association with each other; and the control unit may carry out vehicle exterior image display by using a vehicle-mounted camera of the type or the display method stored in association with the camera point information.

If there is a plurality of vehicle-mounted cameras, desirably, images in an irrelevant direction are not displayed, and if there is a plurality of image display methods, desirably, a more suitable display method is selected. For example, when joining a road having priority, it is desirable to use, preferentially, a camera looking the rightward direction rather than a camera looking in the leftward direction, and it is desirable to provide an enlarged display by a particular camera, rather than a split display from a plurality of cameras. When storing camera point information, by storing information specifying a camera and display method used in the past, in associated fashion, a vehicle exterior image display is carried out by using the same camera or display method.

The vehicle periphery monitoring system according to the second embodiment of the present invention is a vehicle periphery monitoring system comprising a vehicle and a server device.

More specifically, the vehicle comprises a location information acquisition unit configured to acquire current location information on the vehicle; a vehicle-mounted camera configured to capture an image of the exterior of the vehicle; a display device configured to display the image; a server communication unit configured to send the acquired location information to the server device; and a control unit configured to determine whether or not to carry out vehicle exterior image display to output the image acquired from the vehicle-mounted camera to the display device, on the basis of information received from the server device.

The server device comprises a caution point information storage unit configured to store information relating to a caution point, which is a location where use of the vehicle-mounted camera is recommended; a camera recommendation level determination unit configured to acquire location information on the vehicle, and to determine a camera recommendation level, which is information relating to the extent to which use of the vehicle-mounted camera is recommended at a caution point corresponding to the acquired position information; and a vehicle communication unit configured to send the determined camera recommendation level to the vehicle.

The camera recommendation level is information which is returned to the vehicle in response to the sent location information, and is information which indicates the extent to which the use of a vehicle-mounted camera is recommended at the caution point corresponding to the location information. In this way, the server device may provide an extent of recommendability of the vehicle-mounted camera to the vehicle. By holding information relating to caution points in a server, a plurality of vehicles become able to share the same information, and updating of the information can be carried out rapidly. The camera recommendation level may be expressed as a numerical value, or may be expressed as a binary value indicating whether or not the vehicle-mounted cameras ought to be used.

The caution point information storage unit may store map information and the camera recommendation determination unit may determine a caution point on the basis of information included in the map information.

Further, the camera recommendation determination unit may determine a caution point on the basis of information included in the map information may treat a narrow street defined in the map information, as a caution point.

Furthermore, the camera recommendation level determination unit may treat an intersection defined in the map information, as a caution point.

In the second aspect of the present invention, similarly to the first aspect, it is possible to determine a caution point on the basis of map information.

Further, the caution point information storage unit may store a caution point and a camera recommendation level for the caution point in in association with each other and the control unit may carry out vehicle exterior image display, when the camera recommendation level is greater than a prescribed value.

Furthermore, the camera recommendation level corresponding to the caution point may be determined on the basis of the number of times a driver of a vehicle has carried out vehicle exterior image display manually at the caution point.

Desirably, the camera recommendation level is determined on the basis of the number of times that the driver of the vehicle has carried out vehicle exterior image display manually. For example, the cumulative number of vehicle exterior image display operations by other vehicles may be set as the camera recommendation level, or the number of vehicles which have carried out vehicle exterior image display per unit time may be set as the camera recommendation level. The vehicle displays the vehicle exterior image when the camera recommendation level is greater than a threshold value. By adopting a configuration of this kind, other vehicles can carry out vehicle exterior image display automatically, at a point where there is an actual record of a driver carrying out image display manually due to perceiving danger.

Further, the server communication unit may send location information on the vehicle to the server device, when the driver has carried out vehicle exterior image display manually.

By adopting a configuration of this kind, it is possible to gather the information relating to the caution points, from a plurality of vehicles, and this information can be reflected immediately in the information held by the server.

Further, the vehicle may further comprise a vehicle speed acquisition unit configured to acquire the speed of the vehicle and the server communication unit may send the acquired speed of the vehicle, together with location information on the vehicle, to the server device, when the driver has carried out vehicle exterior image display manually.

Furthermore, the camera recommendation level may be a value obtained by multiplying the number of times the driver of the vehicle has carried out vehicle exterior image display manually at the corresponding caution point, by a coefficient determined in accordance with the speed of the vehicle and the coefficient may be larger at a slow speed than at a fast speed.

When sending location information on the vehicle, the vehicle speed may be sent simultaneously. Consequently, the server device can determine a coefficient for calculating the camera recommendation level using the vehicle speed. For example, if a vehicle-mounted camera is used in a situation where the vehicle speed is slow, then this means that the driver is taking caution while the vehicle is travelling and therefore a coefficient is determined in such a manner that the camera recommendation level becomes greater. By adopting a configuration of this kind, the reliability of the camera recommendation level is improved.

Further, the vehicle may further comprise a vehicle speed acquisition unit configured to acquire the speed of the vehicle and the control unit may carry out vehicle exterior image display, when the speed of the vehicle is lower than a prescribed value.

In the second aspect of the present invention, similarly to the first aspect, it is possible to carry out a vehicle exterior image display only when the speed is less than a prescribed speed.

Further, the caution point information storage unit may store the camera recommendation level and a type of vehicle-mounted camera or a display method used by a driver in association with each other and the control unit may carry out vehicle exterior image display by using a vehicle-mounted camera of the type or the display method stored in association with the camera recommendation level.

In the second aspect of the present invention, similarly to the first aspect, the type of vehicle-mounted camera and the display method used in the past may be used when carrying out vehicle exterior image display. Consequently, when another vehicle carries out vehicle exterior image display, it is possible to select a suitable camera and display method.

The present invention can be specified as a vehicle periphery monitoring device and a vehicle periphery monitoring system which includes at least a portion of the abovementioned units. Furthermore, the present invention can also be specified as an image display method including at least a portion of the abovementioned processing. The abovementioned processing and units can be implemented by combining same freely, provided that no technical contradictions arise.

According to the present invention, it is possible to provide a vehicle periphery monitoring device and a vehicle periphery monitoring system, whereby it is possible to determine that the vehicle is travelling in a location where caution is required in driving, and an image of the exterior of the vehicle can be displayed automatically.

BRIEF DESCRIPTION OF DRAWINGS

FIG. 11 is an example of camera recommendation level data relating to a third embodiment;

FIG. 15 is an example of camera recommendation level data relating to the fourth embodiment.

DESCRIPTION OF EMBODIMENTS

First Embodiment (System Configuration)

Figure 1:
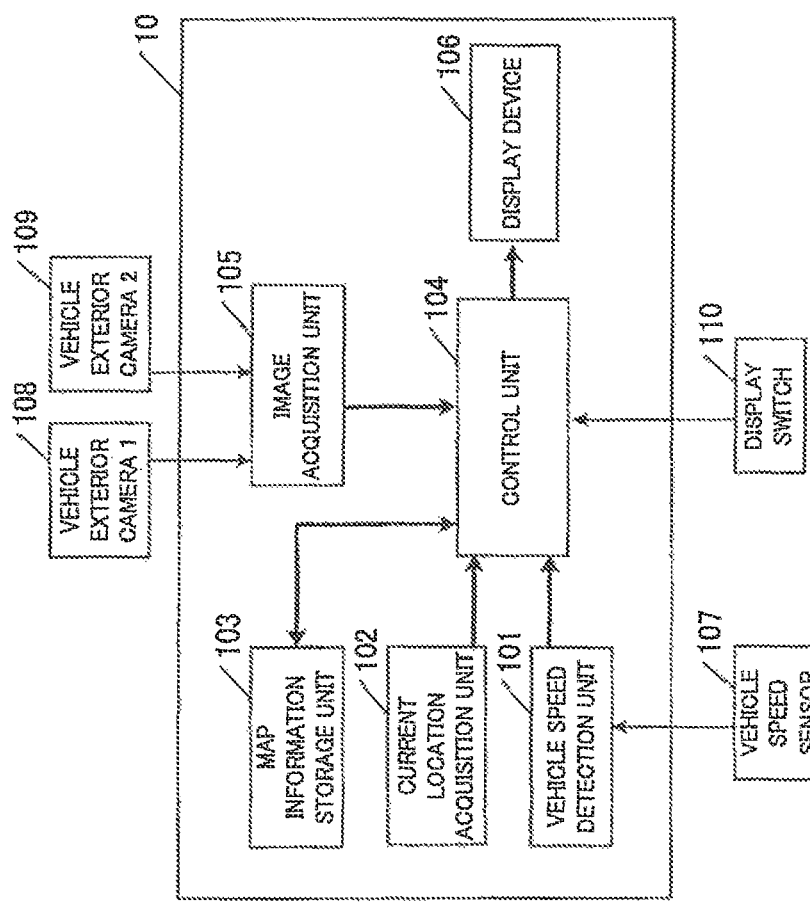
FIG. 1 is a system configuration diagram of a vehicle periphery monitoring device relating to a first embodiment.

A vehicle periphery monitoring device relating to a first embodiment is described now with reference to FIG. 1, which is a system configuration diagram. The vehicle periphery monitoring device 10 relating to the first embodiment is a device which displays images captured by a vehicle-mounted camera which is mounted in a host vehicle and which captures images of the exterior of the vehicle.

A vehicle speed detection unit 101 is a unit which acquires speed information on the vehicle sensor 107. Furthermore, a current location acquisition unit 102 is a unit which acquires current location information (latitude and longitude) of the host vehicle, from a GPS device (not illustrated) provided in a vehicle.

A map information storage unit 103 is a unit which stores map information, and is a caution point information storage unit in the present invention. The map information is, typically, road map data which defines information about the roads on which the vehicle can travel. The map information desirably includes information relating to the road width (breadth) and traffic restrictions, as well as the interconnections between roads.

A controller 104 is a unit which implements overall control of the vehicle periphery monitoring device 10. More specifically, the controller 104 is a unit which refers to the acquired vehicle speed and/or current location information, and caution points extracted by the map information storage unit 103, and determines whether or not the vehicle is in a situation where display of a vehicle exterior image is necessary. Furthermore, the controller 104 has a function for extracting caution points from the map information stored in the map information storage unit 103. The detailed processing is described below.

Figure 2:
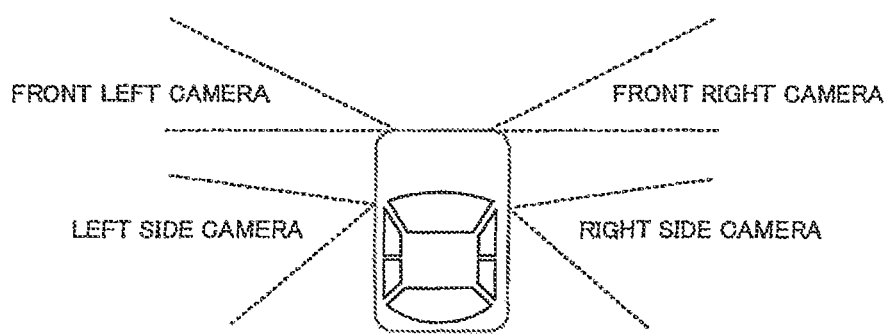
FIG. 2 is a diagram illustrating imaging regions of vehicle-mounted cameras.

An image acquisition unit 105 is a unit which acquires an image from a vehicle exterior camera which is connected thereto. The vehicle exterior camera is a camera installed outside the vehicle in order to compensate for the blind angle of the driver, and is constituted by a plurality of cameras, such as front cameras, side cameras, and so on. FIG. 2 is a diagram illustrating the imaging directions of the respective cameras. The front cameras are cameras for checking traffic at a road intersection and are installed on the left and right sides of the front part of the vehicle. The side cameras are cameras for checking the areas which are at a blind angle for the driver, and are installed on the left and right-hand sides of the vehicle. The image acquisition unit 105 is able to acquire images from this plurality of vehicle exterior cameras. In the present embodiment, it is supposed that two cameras, a vehicle exterior camera 1 (reference numeral 108) and a vehicle exterior camera 2 (reference numeral 109) are connected.

The display device 106 is a unit which presents an image to an occupant of the vehicle. An input image can be displayed by a liquid-crystal monitor, or the like, which is installed inside the vehicle cabin. Furthermore, the display switch 110 is a switch for carrying out a vehicle exterior image display, manually. By pressing the switch, it is possible to cause images captured by the vehicle exterior cameras to be displayed compulsorily on the display device 106.

<Method for Extracting Caution Points>

Next, a method whereby the controller 104 extracts caution points, which are locations where use of the vehicle exterior cameras is recommended, from the stored map information, is described. In the present embodiment, narrow streets, in other words, a region including all roads having a narrow width, are treated as a caution point. According to Japanese law, a narrow street means a road having a width of less than 4.0 metres, but in the disclosure of the invention, the width of the road is not limited in particular.

Figure 3:
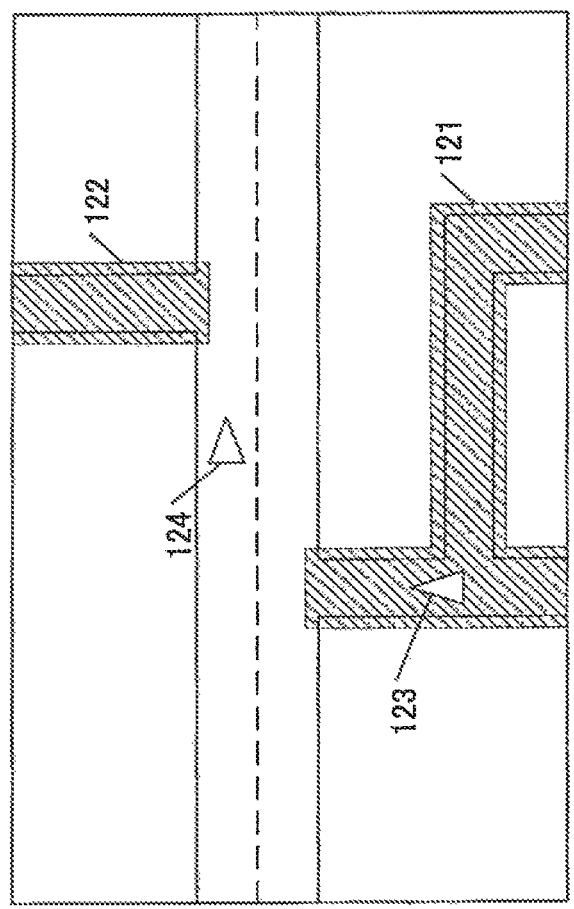
FIG. 3 is a diagram illustrating a caution point determined from map information.

In the case of the roads shown in FIG. 3, which are narrow streets apart from the road crossing the center, the interior of the region 121 and the region 122 which are marked by hatching are caution points. In other words, if the vehicle is situated at the position indicated by reference numeral 123, then it can be determined that the vehicle is travelling through a caution point, and if the vehicle is situated at the position indicated by reference numeral 124, then it can be determined that there is no caution point near the vehicle.

The extraction of caution points does not necessarily have to be carried out on the basis of the width of the road. For example, of the roads which are defined in the map information, regions including roads where it is not expected that the vehicle will be guided by a car navigation device may be treated as caution points. Furthermore, the peripheral regions of locations where roads intersect or merge may be considered to be caution points. For example, a region which is a prescribed distance from the center of an intersection may be treated as a caution point. Furthermore, rather than storing map information, it is also possible to store only the coordinates for defining regions which are caution points.

Moreover, the caution points do not necessarily have to be defined by regions. If the map information is composed of node and link information, then all of the corresponding links may be defined as a caution point.

(Processing Flowchart in Vehicle Periphery Monitoring Device)

Figure 4:
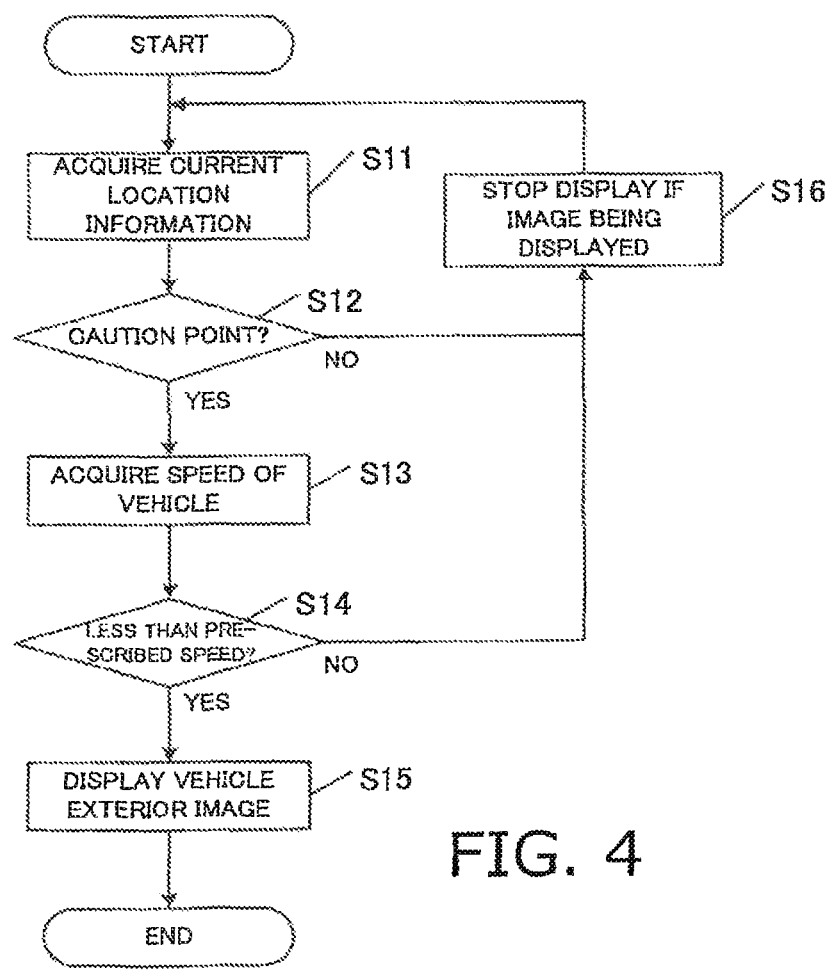
FIG. 4 is a processing flowchart of a vehicle periphery monitoring device relating to the first embodiment.

Next, the processing for determining whether or not to carry out vehicle exterior image display will be described with reference to FIG. 4, which is a flowchart of the processing carried out by the controller 104. Desirably, the flowchart in FIG. 4 is executed periodically, at prescribed time intervals, or each time the vehicle has travelled a prescribed distance. However, this execution is stopped when the vehicle exterior image display is carried out manually.

In step S11, the current location of the vehicle is acquired from a current location acquisition unit 102. The acquired information is latitude and longitude information.

Next, in step S12, it is determined whether the acquired current location of the vehicle is at or near a caution point. More specifically, when the caution point is defined by coordinates, then it is determined whether the current location of the vehicle is near the caution point, and when the caution point is defined by a region, then it is determined whether the current location of the vehicle is in the region.

Furthermore, when the map information is made up of node and link information, it may be determined whether or not the current location of the vehicle is on a link which satisfies the conditions of a caution point.

In step S12, when it is determined that the vehicle is not at or near a caution point, then in cases where the display device 106 is outputting a vehicle exterior image, step S16 for stopping image output is executed, whereupon the processing is returned to step S11. When it has been determined that the vehicle is at or near a caution point, then the processing transfers to step S13.

In step S13, the speed of the vehicle is acquired from the vehicle speed detection unit 101. Thereupon, in step S14, it is determined whether or not the acquired vehicle speed is less than a prescribed speed. The prescribed speed is desirably equal to or greater than the speed at which use of the vehicle exterior cameras is envisaged; for example, the prescribed speed may be set to 10 kilometers per hour.

When the speed of the vehicle is equal to or greater than the prescribed value, then in cases where the display device 106 is outputting a vehicle exterior image, step S16 for stopping image output is executed, whereupon the processing is returned to step S11. When the vehicle speed is less than the prescribed speed, then the processing transfers to step S15, and an image acquired from the image acquisition unit 105 is output to the display device 106.

In the first embodiment, a caution point is extracted from the map information stored in the map information storage unit 103, and by comparing this with the acquired position information, it is determined whether the vehicle is situated at a location where use of the vehicle exterior camera is recommended. Consequently, a vehicle exterior monitor image can be displayed reliably at a location where a safety check is necessary.

Modification of First Embodiment

The present modification is a mode wherein, in addition to the first embodiment, a location where display of a vehicle exterior image has been carried out manually in the past is stored, and the display of a vehicle exterior image is carried out preferentially at this location. The system configuration of the vehicle periphery monitoring device according to the present modification is similar to the first embodiment. Furthermore, the processes other than the steps described below are similar to the first embodiment.

Figure 5:
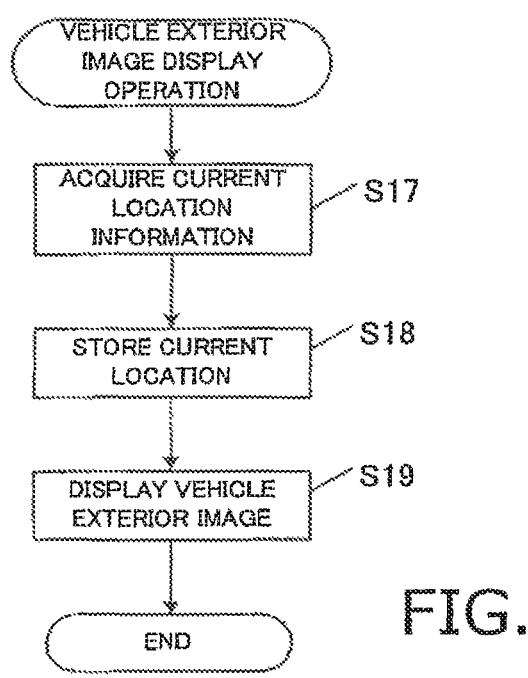
FIG. 5 is a processing flowchart of a vehicle periphery monitoring device relating to a modification of the first embodiment.

FIG. 5 is a flowchart of processing which is carried out when the driver presses the display switch 110.

Firstly, in step S17, the controller 104 acquires the current location of the vehicle from the current location acquisition unit 102. Thereupon, the acquired current location is stored in the map information storage unit 103 as a caution point (S18). The stored information may be only coordinates representing the acquired current location, or may be a region of a desired size centered on the location of the vehicle. If an intersection, or the like, is near, then the information may be a region which includes the intersection.

Figure 6:
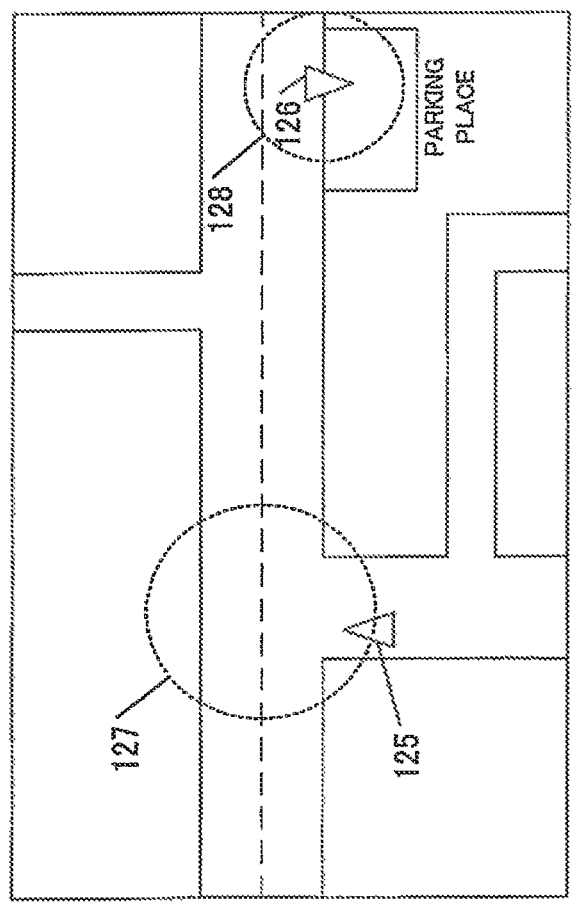
FIG. 6 is an example of caution points using camera point information.

One example of the processing in step S18 is described here with reference to FIG. 6. Here, when the display switch 110 is pressed at the location indicated by reference numeral 125, then the region 127 including the T-shaped road situated nearby is stored as a caution point. Furthermore, when there is no intersection, or the like, nearby, as at reference numeral 126, then the region 128 centered on this point is stored as a caution point. As a result of operating the display switch at the location of the reference numerals 125 and 126, the regions 127 and 128 are stored as new caution points.

After the storage of the caution points has been completed, the controller 104 carries out vehicle exterior image display (S19).

When a caution point stored as described above and the current location of the vehicle are matching in the processing in step S12, then vehicle exterior image display is carried out automatically, similarly to the first embodiment. The display of images may be unconditional, or may use conditions, for instance, by storing the number of times a manual display has been carried out, such as "carry out display if manual display has been carried out a prescribed number of times or more in the past". Furthermore, the caution point stored in step S18 may be erased when a prescribed time has elapsed.

Apart from this, the type of camera and display method used may be stored in association with the location information. For example, it is possible to store information such as "display image acquired from front right camera, full screen, in region 127" and "display surround view using all cameras, in region 128". By adopting this configuration, it is possible to carry out the same display at a location where the vehicle-mounted cameras have been used in the past.

Second Embodiment

The second embodiment is a mode in which the vehicle sends the current location to a server device, and the server device indicates to the vehicle whether or not use of the vehicle-mounted cameras is necessary at the location in question. Units which are the same as the first embodiment are labelled with the same reference numerals and description thereof is omitted here. Furthermore, the operations other than the steps described below are similar to the first embodiment.

Figure 7:
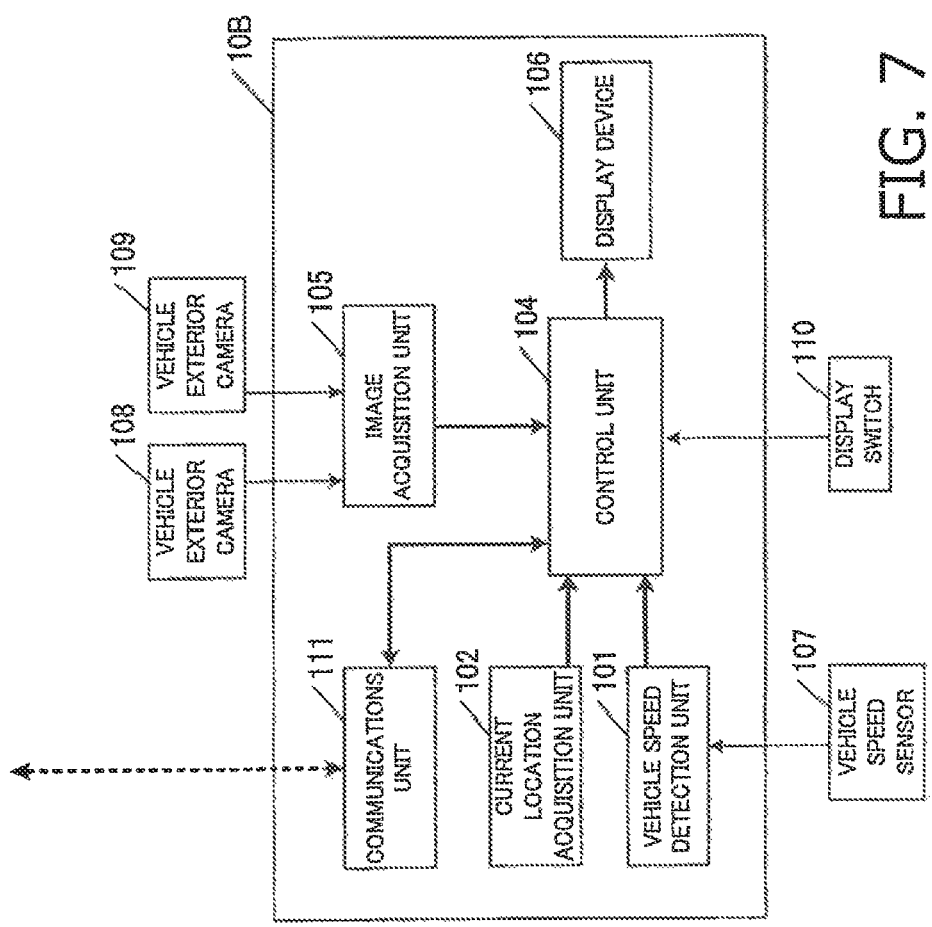
FIG. 7 is a system configuration diagram of a vehicle periphery monitoring device relating to a second embodiment.

FIG. 7 is a system configuration diagram of a vehicle periphery monitoring device 10B relating to a second embodiment. In the vehicle periphery monitoring device 10B, a communications unit 111 which is a unit which communicates with a server is provided, instead of the map information storage unit 103. In the present embodiment, the communications unit 111 communicates with the server device by wireless communications using a portable telephone network.

The units other than the units described above are similar to the first embodiment.

Figure 8:
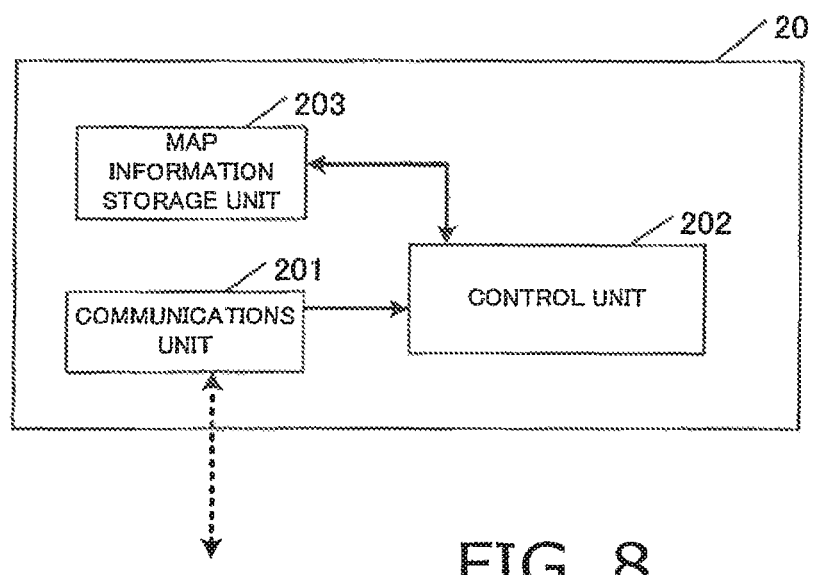
FIG. 8 is a system configuration diagram of a server device relating to the second embodiment.

FIG. 8 is a system configuration diagram of a server device 20.

The communications unit 201 is a unit which communicates with the vehicle periphery monitoring device 10B. Furthermore, a controller 202 is a unit which implements overall control of the server device 20. More specifically, the controller is a unit which determines whether or not use of the vehicle-mounted camera is necessary, by referring to the acquired location information and the stored map information. The controller 202 is a camera recommendation level determination unit in the present invention. In the present embodiment, the camera recommendation level is binary information indicating either "the vehicle-mounted cameras ought to be used" or "the vehicle-mounted cameras do not have to be used".

The map information storage unit 203 is a unit which stores road map data, similarly to the map information storage unit 103.

In the second embodiment, the processing carried out by the vehicle periphery monitoring device 10B and the server device 20 is described with reference to FIG. 4, which is a flowchart relating to the first embodiment. In the second embodiment, the subject which is carrying out the processing differs from the first embodiment.

In step S11, the controller 104 sends current location information that has been acquired, to the server device, via the communications unit 111. Thereupon, in step S12, the controller 202 determines whether the current location of the vehicle thus acquired is at or near a caution point, and sends the determination result to the communications unit 111. The method for determining whether the current location of the vehicle is at or near a caution point is the same as step S12 in the first embodiment.

According to the second embodiment, the map information can be managed in the server device, and therefore the same information can be sent to a plurality of vehicles. Furthermore, there is no need for the vehicle to hold a large volume of map information, and information can be updated swiftly.

Third Embodiment

The third embodiment is a mode in which, when the driver of the vehicle uses the vehicle exterior cameras, the vehicle sends a notification that the cameras are being used, and the location information on the vehicle, to a server device, and the server device calculates a camera recommendation level on the basis of the received information. Units which are the same as the first and second embodiments are labelled with the same reference numerals and description thereof is omitted here.

Figure 9:
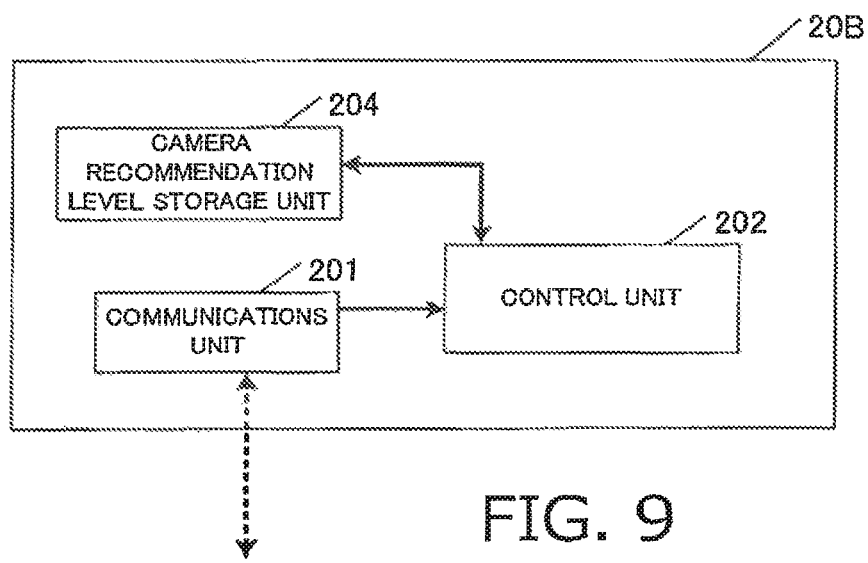
FIG. 9 is a system configuration diagram of a server device relating to a third embodiment.

The system configuration of the vehicle periphery monitoring device 10B according to the third embodiment is similar to the second embodiment. Moreover, FIG. 9 is a system configuration diagram of a server device 20B relating to a third embodiment.

The camera recommendation level storage unit 204 is a unit which stores camera recommendation level data which is information representing the extent to which display of vehicle exterior images is recommended at a particular point, and is a caution point information storage unit in the present invention. The camera recommendation level data is generated on the basis of information such as "have used vehicle exterior cameras" received from another vehicle. The detailed method for generating this data is described below. The composition of the server device 20B other than the camera recommendation level storage unit 204 is similar to that of the second embodiment.

(Generation of Camera Recommendation Level Data)

Figure 10:
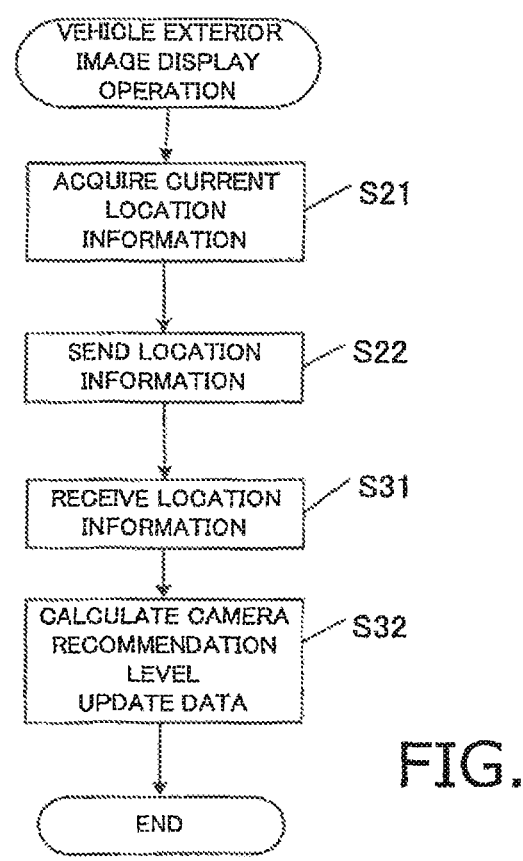
FIG. 10 is a processing flowchart of a vehicle periphery monitoring device and a server device relating to the third embodiment.

The method for generating camera recommendation level data is described here with reference to FIG. 10 which is a flowchart of the processing carried out by the vehicle periphery monitoring device 10B and the server device 20B relating to the third embodiment. Steps S21 to S22 are steps which are carried out by the vehicle periphery monitoring device 10B, and steps S31 to S32 are steps which are carried out by the server device 20B.

The flowchart in FIG. 10 is started when the driver of the vehicle uses the display switch 110 to carry out a vehicle exterior image display.

Firstly, the controller 104 acquires the current location of the vehicle from the current location acquisition unit 102 (S21). Next, the controller 104 sends current location information that has been acquired, to the server device, via the communications unit 111 (S22). The display of the vehicle exterior images may be carried out at any timing.

On the other hand, the controller 202 acquires location information sent from the vehicle via the communications unit 201 (S31), and after calculating the camera recommendation level, updates the data stored by the camera recommendation level storage unit 204 (S32).

The method for calculating the camera recommendation level is now described. FIG. 11 is a diagram illustrating the camera recommendation level data stored in the camera recommendation level storage unit 204, in table format. The camera recommendation level data includes location information, and a camera recommendation level corresponding to that location information. The camera recommendation level is the number of times that the vehicle exterior cameras have been used near to that location.

In step S32, the controller 202 retrieves a record corresponding to the received position information, from the stored camera recommendation level data, and adds up the camera recommendation levels of the record. If there is no corresponding record, then a record corresponding to the current location is generated. The camera recommendation level when the record is generated is 1.

The method for determining whether or not there is a corresponding record will now be described. In step S32, the location information received from the vehicle and the location information on the stored record are compared, and if the two points are within a prescribed distance of each other, then they are regarded as the same point.

Figure 12:
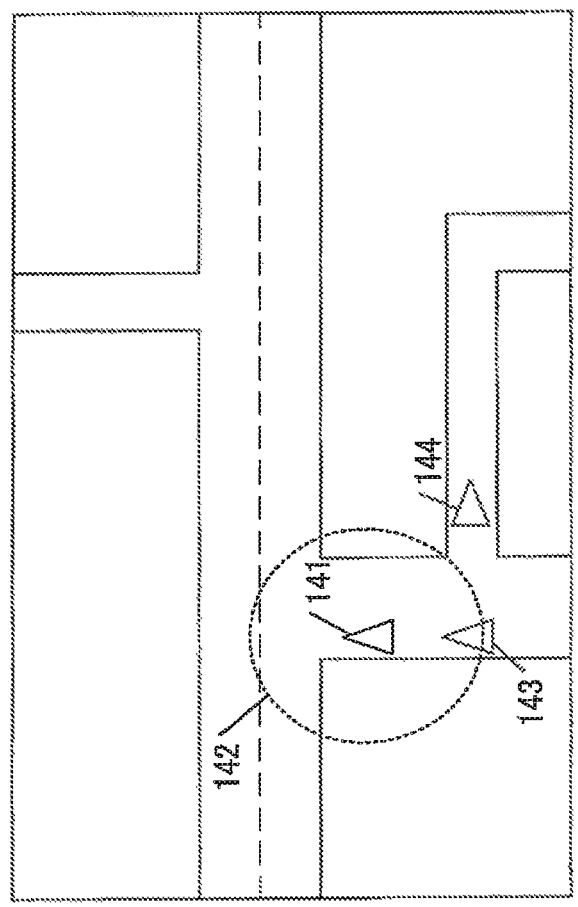
FIG. 12 is a diagram illustrating a method for determining the same point in the third embodiment.

An example of this is illustrated in FIG. 12. For example, it is supposed that a certain vehicle has used the vehicle exterior cameras at the point indicated by reference numeral 141. A record corresponding to the point indicated by reference numeral 141 is generated in the camera recommendation level storage unit, and the camera recommendation level for that record is set as 1. Next, it is supposed that another vehicle has used the vehicle exterior cameras at the point indicated by reference numeral 143. Since this point is within a prescribed distance (reference numeral 142) of the point indicated by reference numeral 141 which has already been stored, then it is considered to be the same point as reference numeral 141, and hence the camera recommendation level of the record corresponding to the point indicated by reference numeral 141 is set to 2. If yet a further vehicle uses the vehicle exterior cameras at the point indicated by reference numeral 144, then since this vehicle is separated by the prescribed distance or more from the point indicated by reference numeral 141, then a new record is generated.

In this way, the processing indicated in FIG. 10 is executed each time another vehicle uses the vehicle exterior cameras, and camera recommendation level data associated with the location information (in other words, caution points) is added and updated.

(Determining Use of Vehicle-Mounted Cameras)

Figure 13:
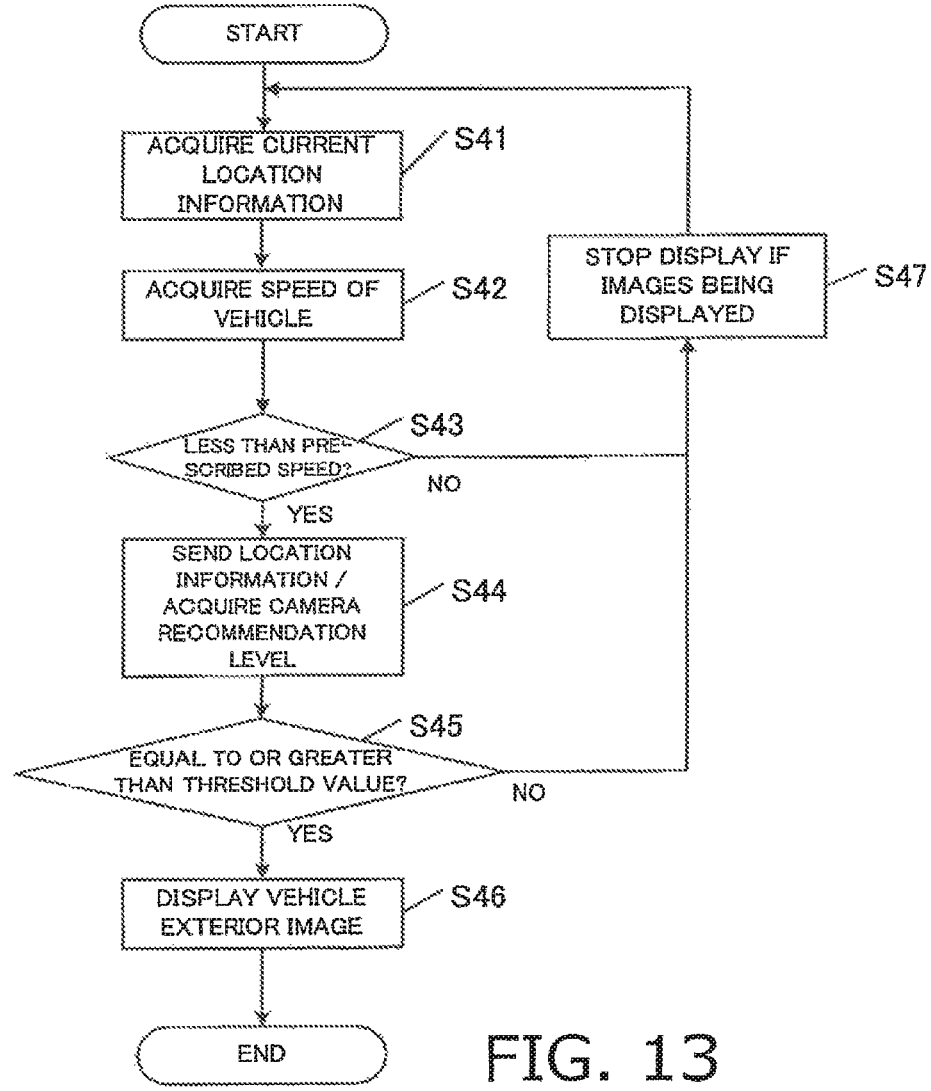
FIG. 13 is a processing flowchart of a vehicle periphery monitoring device relating to the third embodiment.

Next, a method for determining whether or not the vehicle is to carry out a vehicle exterior image display, using the stored camera recommendation level data, will be described. FIG. 13 is a flowchart of the processing which is carried out by the vehicle periphery monitoring device 10B. Similarly to the first embodiment, the processing shown in FIG. 13 is desirably carried out at periodic intervals, and execution of the processing is desirably halted, while vehicle exterior image display is being carried out manually.

Firstly, the controller 104 acquires the current location of the vehicle from the current location acquisition unit 102 (S41), and acquires the speed of the vehicle from the vehicle speed detection unit 101 (S42).

Thereupon, in step S43, it is determined whether or not the acquired vehicle speed is less than a prescribed speed. The prescribed speed can take the same value as the first embodiment. When the vehicle speed is equal to or greater than the prescribed value, then in cases where the display device 106 is outputting a vehicle exterior image, step S47 for stopping display is executed, whereupon the processing is returned to step S41. When the vehicle speed is less than the prescribed value, then the processing is transferred to step S44.

Step S44 is processing for sending the current location information to the server device and for receiving a camera recommendation level. The detailed contents of this step will now be described.

Firstly, the controller 104 sends the current location information that has been acquired, to the server device, via the communications unit 111. Thereupon, the controller 202 retrieves the camera recommendation level data from the camera recommendation level storage unit 204, using the acquired location information. In this case, the acquired location information and the location information in the stored record are compared, and if the two points are within a prescribed distance of each other, then they are considered to be matching, and the corresponding camera recommendation level is sent via the communications unit 201. If there is no corresponding record, then the sent camera recommendation level is set to 0.

In step S45, the controller 104 determines whether or not the acquired camera recommendation level is equal to or greater than a threshold value. The threshold value can take any value. When the camera recommendation level is less than a prescribed value, then in cases where the display device 106 is outputting a vehicle exterior image, step S47 for stopping display is executed, whereupon the processing is returned to step S41. When the camera recommendation level is equal to or greater than the threshold value, then the processing transfers to step S46, and vehicle exterior image display is carried out. If the threshold value used here is taken to be n, then the vehicle exterior image display is carried out when the camera recommendation level is equal to or greater than n, in other words, when n or more vehicles have used the vehicle exterior cameras at the corresponding location.

As described above, in the third embodiment, the camera recommendation level data is generated or updated using the information sent from vehicles. This mode has an advantage in that the server device does not have to hold information relating to caution points in advance, and an advantage in that information suited to the actual road circumstances can be shared between vehicles.

In the present embodiment, the actual number of times that the vehicle exterior cameras have been used is set as the camera recommendation level, but it is also possible to use a result calculated on the basis of this number of times. For example, the number of times that the vehicle exterior cameras have been used during a prescribed period of time in the past may be used as the camera recommendation level.

Furthermore, it is also possible to store the type of camera or the display method used, in association with the camera recommendation level. For instance, the highest camera recommendation level may be sent to vehicles, together with the relevant camera type or display method, and a plurality of camera recommendation levels may be sent to vehicles for each camera type or display method.

Fourth Embodiment

The fourth embodiment is a mode in which weighting of the camera recommendation level is applied to the third embodiment, in accordance with the vehicle speed and the location information. Units which are the same as the third embodiment are labelled with the same reference numerals and description thereof is omitted here. The system configuration of the vehicle periphery monitoring device 10B according to the fourth embodiment is similar to the third embodiment.

Figure 14:
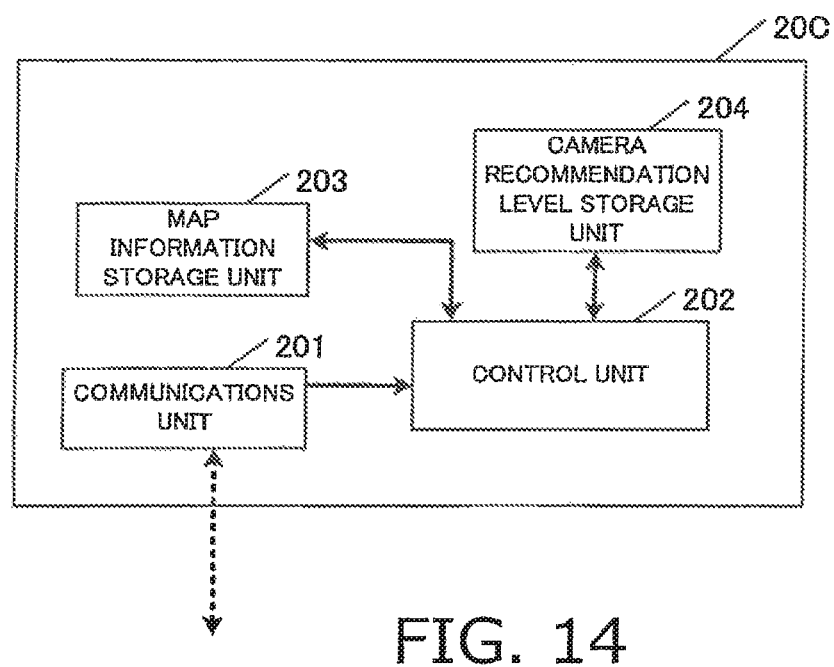
FIG. 14 is a system configuration diagram of a server device relating to a fourth embodiment.

FIG. 14 is a system configuration diagram of a server device 20C relating to a fourth embodiment. The server device 20C includes both the map information storage unit 203 which was described in the second embodiment and the camera recommendation level storage unit 204 which was described in the third embodiment.

Here, the points of difference with respect to the present embodiment are described by referring to FIG. 10 which is a flowchart of the processing by the server device relating to the third embodiment.

In step S21, the controller 104 acquires the vehicle speed from the vehicle speed detection unit 101, simultaneously with acquiring the current location information. Thereupon, at step S22, the controller 104 sends the vehicle speed to the server device, simultaneously with the location information. Apart from the addition of the vehicle speed to the information that is acquired and sent, the processing is the same as the third embodiment.

Thereupon, in step S31, the location information and vehicle speed that have been sent are acquired by the communications unit 201, and in step S32, the controller 202 calculates a camera recommendation level.

More specifically, the calculation of the camera recommendation level is performed by the following processing.
(1) A record corresponding to the acquired location information is retrieved from the camera recommendation level data
(2) The acquired vehicle speed is classified and the number of camera operations in the corresponding speed band is added up
(3) The numbers of camera operations in each speed band are weighted in accordance with the speed and are totalized
(4) A weighting corresponding to the location is applied to the totalized value, and the resulting value is set as the camera recommendation level The respective processes are described here with reference to FIG. 15, which is an example of camera recommendation level data in the present embodiment.

Firstly, it is checked whether or not a record corresponding to the acquired location information is present in the camera recommendation level data. The corresponding record is retrieved using the same method as that in step S32. If there is no corresponding record, a new record is generated, but in this case, the road type of the location corresponding to the location information is acquired from the map information storage unit 203 and is applied. The road type means information such as "intersection", "T-shaped road", "curve" and "narrow street", for example.

Next, the acquired vehicle speed is classified according to speed. In the present embodiment, the vehicle speed is classified into three levels: "crawl", "slow", "other". For example, the vehicle speed can be classified as: 0 to less than 10 kilometers per hour, 10 to less than 20 kilometers per hour and more than 20 kilometers per hour, or the like.

Next, the number of camera operations corresponding to the classified vehicle speed in the records identified in (1) is added up. In the case of the example in FIG. 15, when the object is record No. 1 and the classified speed is "crawl", then the value "number of camera operations (crawl)" is added up.

The numbers of camera operations in each speed band are weighted according to speed and are totalized. In the present example, the categories "crawl", "slow" and "other" are respectively multiplied by coefficients of 1.5, 1.0 and 0.5. When calculating the value for record No. 1, the totalized value is 50×1.5+20×1.0+10×0.5=100, and in the case of record No. 2, the totalized value is 10×1.5+20×1.0+10×0.5=40. Desirably, the coefficient for each speed band becomes larger, the lower the speed.

Thereupon, coefficients for each road type are used to apply a weighting to the number of camera operations. For example, when the coefficient for the road type "intersection" which corresponds to record No. 1 is 1.0, then the weighted result is 100, and when the coefficient for the road type "narrow street" which corresponds to record No. 2 is 0.5, then the weighted result is 20. This result is the camera recommendation level for the respective point. The coefficients for each road type desirably become larger, the greater the need for caution when driving.

In the fourth embodiment, weightings are applied to the number of camera operations by using the road type of the location where the cameras have been used, and the vehicle speed when the cameras were used. Accordingly, the degree of importance of the display of vehicle exterior images can be reflected in the camera recommendation level, and more accurate determination can be achieved.

The descriptions of the respective embodiments are examples for the purpose of explaining the present invention, and the present invention can be implemented by appropriately modifying or combining these embodiments, without departing from the essence of the invention. For example, the information which is sent to the server from the vehicle does not have to indicate an extent of recommendability of the use of the vehicle exterior cameras, as indicated in the examples. The information may be any information, provided that the information sends the fact that the vehicle is situated in a location where use of the vehicle exterior cameras is recommended. Furthermore, the camera recommendation level may be stored in advance in a server device, without necessarily having to be gathered from the vehicle. Furthermore, in the descriptions of the respective embodiments, it was determined whether or not to carry out a display of vehicle exterior images on the basis of the vehicle speed, but the vehicle speed information does not necessarily have to be used.

This application claims the benefit of Japanese Patent Application No. 2012-161918, filed on Jul. 20, 2012, which is hereby incorporated by reference herein in its entirety.

REFERENCE SIGNS 10, 10B VEHICLE PERIPHERY MONITORING DEVICE
101 VEHICLE SPEED DETECTION UNIT
102 CURRENT LOCATION ACQUISITION UNIT
103 MAP INFORMATION STORAGE UNIT
104 CONTROL UNIT
105 IMAGE ACQUISITION UNIT
106 DISPLAY DEVICE
107 VEHICLE SPEED SENSOR
108,109 VEHICLE EXTERIOR CAMERA
110 DISPLAY SWITCH
20, 20B, 20C SERVER DEVICE
201 COMMUNICATIONS UNIT
202 CONTROL UNIT
203 MAP INFORMATION STORAGE UNIT
204 CAMERA RECOMMENDATION LEVEL STORAGE UNIT

The invention claimed is:

1. A vehicle periphery monitoring system comprising:
a vehicle; and
a server, wherein
the vehicle includes:
   a vehicle-mounted camera configured to capture an image of the exterior of the vehicle;
   a display configured to display the image;
   a location information acquisition unit configured to acquire location information on the vehicle;
   a control unit configured to determine whether or not to carry out vehicle exterior image display to output the image acquired from the vehicle-mounted camera to the display, on the basis of instructions from a user or information received from the server; and
   a communication unit configured to (i) periodically send the location information on the vehicle as first location information to the server and (ii) when the user manually carries out the vehicle exterior image display, send the location information on the vehicle as second location information to the server,
the server includes:
   a storage unit configured to store information relating to a plurality of caution points, each of which is a location where use of the vehicle-mounted camera is recommended, and the number of times a plurality of the users have manually carried out vehicle exterior image display at each of the plurality of the caution points, in association with each other; and
   a determination unit configured to generate caution information for determining whether to use the vehicle-mounted camera or not on the basis of the information stored in the storage unit and send the generated caution information to the vehicle, when the first location information is received.

2. The vehicle periphery monitoring system according to claim 1, wherein
the vehicle further includes a vehicle speed acquisition unit configured to acquire the speed of the vehicle, and
the communication unit sends the speed of the vehicle to the server, together with the second location information.

3. The vehicle periphery monitoring system according to claim 2, wherein
the caution information is a camera recommendation level, which is the extent to which use of the vehicle-mounted camera is recommended,
the camera recommendation level is a value obtained by multiplying the number of times the plurality of users have manually carried out vehicle exterior image display, by a coefficient determined in accordance with the speed of the vehicle, and
the coefficient is larger at a slow speed than at a fast speed.

4. The vehicle periphery monitoring system according to claim 1, wherein
the vehicle further includes a vehicle speed acquisition unit configured to acquire the speed of the vehicle, and
the control unit does not carry out vehicle exterior image display, when the speed of the vehicle is higher than a prescribed value.

5. The vehicle periphery monitoring system according to claim 1, wherein
the communication unit sends a type of vehicle-mounted camera or a display method used by the user to the server, together with the second location information,
the storage unit stores the information relating to the plurality of caution points and the type of vehicle-mounted camera or the display method in association with each other,
the determination unit causes information indicating the type of vehicle-mounted camera or the display method to be included in the caution information, and
the control unit carries out vehicle exterior image display by using the type of vehicle-mounted camera or the display method included in the caution information.

6. A vehicle periphery monitoring method performed by:
a vehicle provided with a vehicle-mounted camera configured to capture an image of the exterior of the vehicle, and a display; and a server configured to store information relating to a plurality of caution points, each of which is a location where use of the vehicle-mounted camera is recommended, the method implemented by the vehicle comprising:
- a location information acquisition step of acquiring location information on the vehicle;
- a control step of determining whether or not to carry out vehicle exterior image display to output the image acquired from the vehicle-mounted camera to the display, on the basis of instructions from a user or information received from the server; and
- a communication step of (i) periodically sending the location information on the vehicle as first location information to the server and (ii) when the user manually carries out the vehicle exterior image display, sending the location information on the vehicle as second location information to the server, the method implemented by the server comprising:
- a storage step of storing information relating to a plurality of caution points, each of which is a location where use of the vehicle-mounted camera is recommended, and the number of times a plurality of the users have manually carried out vehicle exterior image display at each of the plurality of the caution points, in association with each other in a storage unit; and
- a determination step of generating caution information for determining whether to use the vehicle-mounted camera or not on the basis of information stored in the storage unit, and sending the generated caution information to the vehicle, when the first location information is received.

* * * * *